(12) United States Patent
Yamamichi et al.

(10) Patent No.: US 12,467,402 B2
(45) Date of Patent: Nov. 11, 2025

(54) SUPERCHARGER

(71) Applicant: KABUSHIKI KAISHA TOYOTA JIDOSHOKKI, Aichi (JP)

(72) Inventors: Toshihiro Yamamichi, Aichi (JP); Daisuke Terui, Aichi (JP); Keisuke Mizutani, Aichi (JP); Hideki Ukai, Aichi (JP)

(73) Assignee: KABUSHIKI KAISHA TOYOTA JIDOSHOKKI, Aichi (JP)

( * ) Notice: Subject to any disclaimer, the term of this patent is extended or adjusted under 35 U.S.C. 154(b) by 0 days.

(21) Appl. No.: 19/022,000

(22) Filed: Jan. 15, 2025

(65) Prior Publication Data

US 2025/0243800 A1     Jul. 31, 2025

(30) Foreign Application Priority Data

Jan. 30, 2024  (JP) ................ 2024-011685

(51) Int. Cl.
 *F02B 39/14*   (2006.01)

(52) U.S. Cl.
CPC .......... *F02B 39/14* (2013.01); *F05D 2220/40* (2013.01); *F05D 2240/54* (2013.01); *F05D 2240/55* (2013.01); *F05D 2240/60* (2013.01)

(58) Field of Classification Search
CPC ............................. F02B 39/005; F02B 39/14
See application file for complete search history.

(56) References Cited

U.S. PATENT DOCUMENTS

| | | | |
|---|---|---|---|
| 5,076,755 A | 12/1991 | Okada | |
| 2005/0232775 A1 | 10/2005 | Thiele et al. | |
| 2016/0265426 A1* | 9/2016 | Annati | F04D 29/266 |
| 2021/0159760 A1* | 5/2021 | Henderson | F02B 39/10 |

FOREIGN PATENT DOCUMENTS

| | | | | |
|---|---|---|---|---|
| CN | 104769232 A | * | 7/2015 | ............ F02B 39/10 |
| CN | 104040145 B | * | 12/2017 | ............ H02K 9/19 |
| DE | 102022129324 B3 | * | 2/2024 | ............ F01D 5/025 |
| EP | 3369908 A1 | * | 9/2018 | ............ F02B 39/00 |
| JP | 2-271105 | | 11/1990 | |
| JP | 2005-532506 | | 10/2005 | |
| JP | 2023-167847 | | 11/2023 | |
| WO | WO-2018207550 A1 | * | 11/2018 | ............ H02K 9/19 |

* cited by examiner

*Primary Examiner* — Ngoc T Nguyen
(74) *Attorney, Agent, or Firm* — Greenblum & Bernstein, P.L.C.

(57) ABSTRACT

A supercharger includes a rotary shaft having a turbine wheel and a compressor impeller, a main bearing in contact with an oil area of the rotary shaft where lubricating oil is retained and configured to rotatably support the rotary shaft, and an auxiliary bearing in contact with the oil area and configured to rotatably support the rotary shaft when the main bearing is unable to support the rotary shaft.

6 Claims, 3 Drawing Sheets

SUPERCHARGER

CROSS-REFERENCE TO RELATED APPLICATION

This application claims priority to Japanese Patent Application No. 2024-011685 filed on Jan. 30, 2024, the entire disclosure of which is incorporated herein by reference.

The present disclosure relates to a supercharger. Specifically, the present disclosure relates to a supercharger that includes a rotary shaft having a turbine wheel and a compressor impeller.

BACKGROUND ART

Japanese Patent Application Publication No. 2023-167847 discloses a lubricating structure for a rolling bearing that rotatably supports the rotary shaft. In this structure, an oil reservoir that stores lubricating oil supplied through an oil passage is formed around the rolling bearing. Thus, at a start of operation, when a flow rate of lubricating oil flowing through the oil passage decreases, lubricating oil is supplied from the oil reservoir to the rolling bearing. As a result, even at the time of starting operation, the rolling bearing is suitably lubricated.

If performance of the rolling bearing deteriorates, it may become difficult to stably support the rotary shaft. In this case, runout of the rotary shaft increases. As a result, there is a fear that one of the rotary shaft, a turbine wheel, and a compressor impeller (hereinafter, collectively referred to as a rotating body) may be in contact with surrounding parts (e.g., an inner surface of a housing forming the supercharger).

The present disclosure has been made in view of such a problem, and is directed to providing a supercharger that can prevent contact between a rotary shaft and surrounding parts even when performance of a bearing deteriorates.

SUMMARY

In accordance with an aspect of the present disclosure, there is provided a supercharger including a rotary shaft having a turbine wheel and a compressor impeller, a main bearing in contact with an oil area of the rotary shaft where lubricating oil is retained and configured to rotatably support the rotary shaft, and an auxiliary bearing in contact with the oil area and configured to rotatably support the rotary shaft when the main bearing is unable to support the rotary shaft.

Other aspects and advantages of the disclosure will become apparent from the following description, taken in conjunction with the accompanying drawings, illustrating by way of example the principles of the disclosure.

BRIEF DESCRIPTION OF DRAWINGS

The disclosure, together with objects and advantages thereof, may best be understood by reference to the following description of the presently preferred embodiments together with the accompanying drawings in which.

DETAILED DESCRIPTION OF THE EMBODIMENTS

Figure 1:
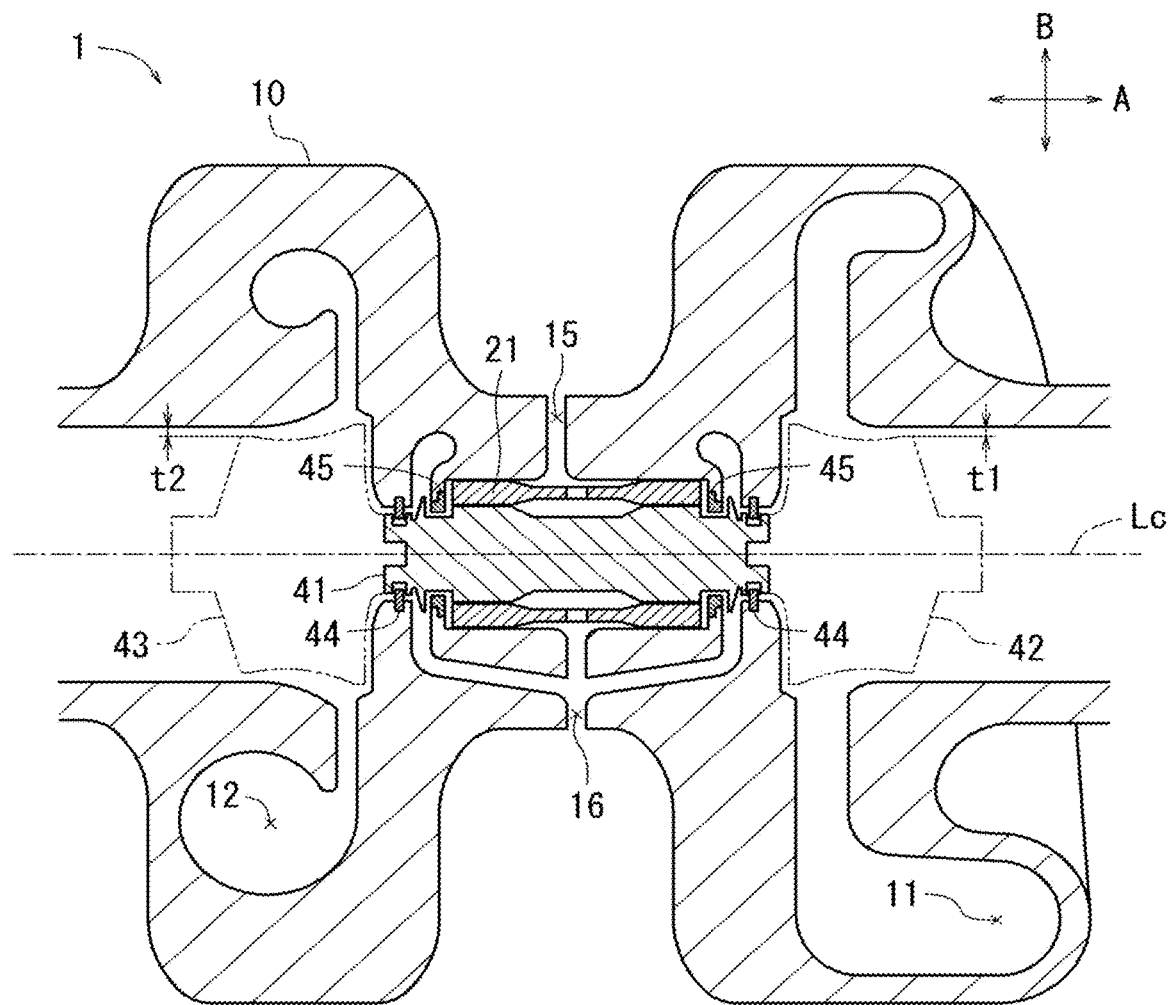
FIG. 1 is a schematic cross-sectional view of a supercharger according to an embodiment.
Figure 2:
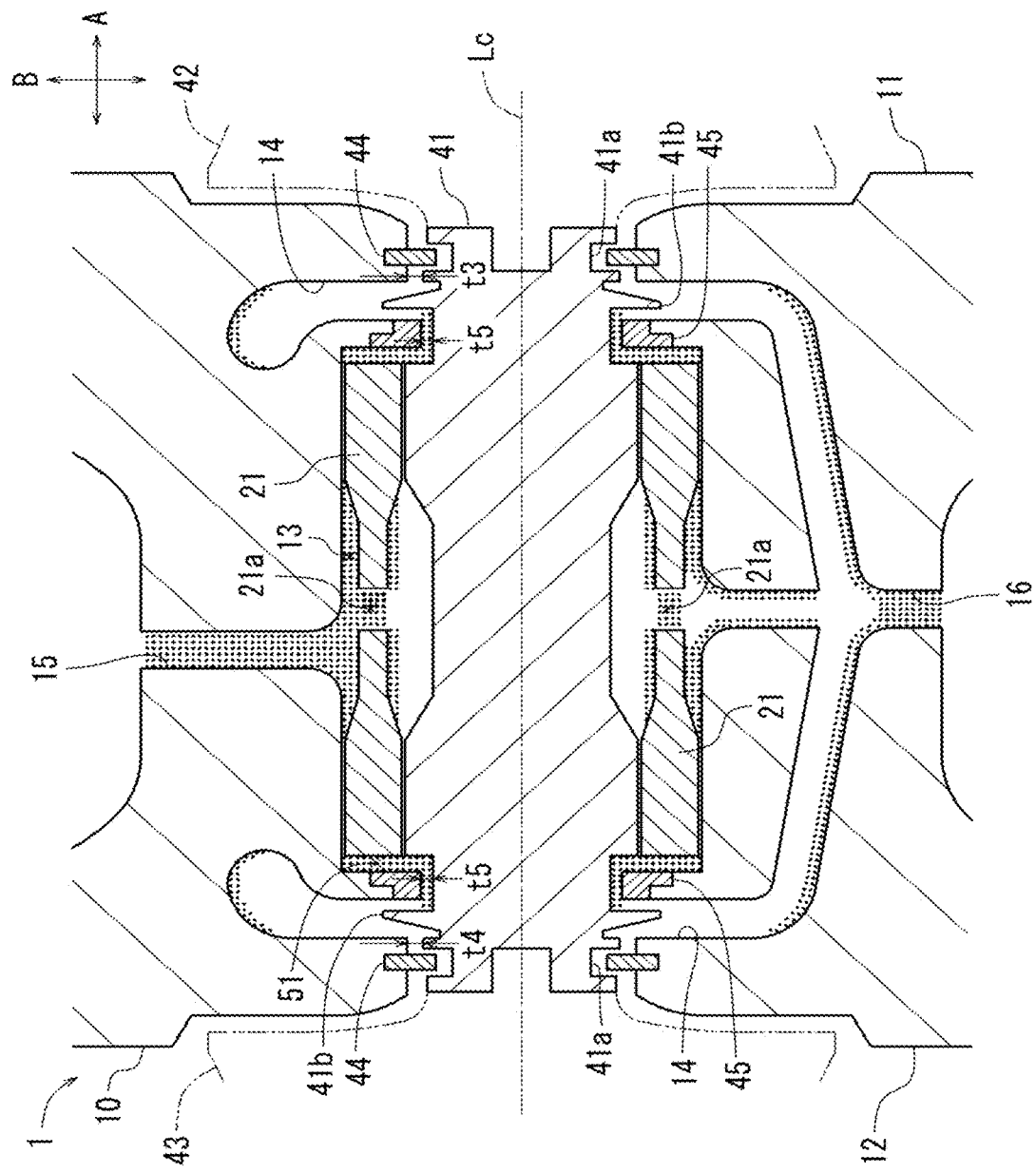
FIG. 2 is a partially enlarged cross-sectional view of the supercharger.
Figure 3:
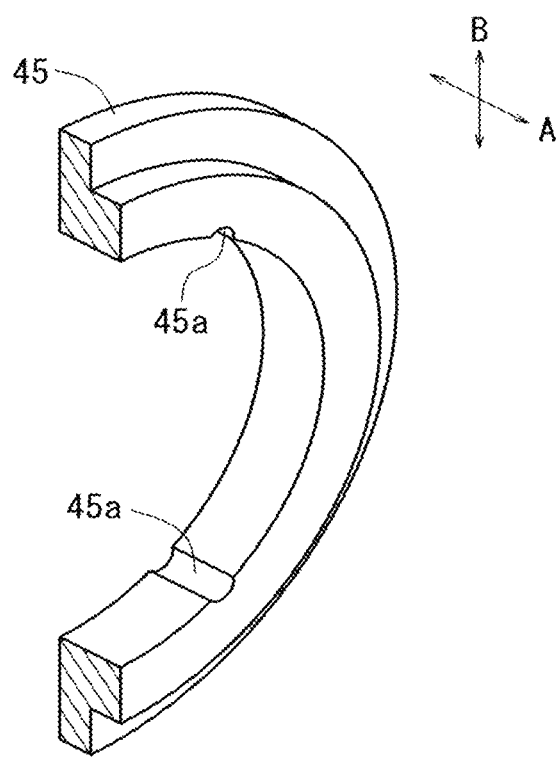
FIG. 3 is a perspective cross-sectional view of an auxiliary bearing of the supercharger.

The following will describe an embodiment of the present disclosure with reference to FIGS. 1 to 3. The same symbol (reference numeral) in the description refers to the same element that has the same function, and the description thereof will not be repeated. A supercharger 1 of the present embodiment is disposed in an internal combustion engine (not illustrated) mounted on a vehicle as a power source. The supercharger 1 is operated by exhaust gas from the internal combustion engine, and pressurizes and feeds intake air for the internal combustion engine.

As illustrated in FIGS. 1 and 2, the supercharger 1 includes a main body case 10, a main bearing 21, a rotary shaft 41, a turbine wheel 42, a compressor impeller 43, a pair of shaft seals 44, and a pair of auxiliary bearings 45 accommodated in the main body case 10.

The main bearing 21 rotatably supports the rotary shaft 41. The turbine wheel 42 is fixed to one end of the rotary shaft 41. The compressor impeller 43 is fixed to the other end of the rotary shaft 41. Thus, the turbine wheel 42 and the compressor impeller 43 rotate integrally with the rotary shaft 41 that is held (supported) by the main bearing 21. The rotary shaft 41, the turbine wheel 42, and the compressor impeller 43 are collectively referred to as a "rotating body."

The dashed lines Lc in FIGS. 1 and 2 each indicate an axis of the rotary shaft 41 (i.e., a rotational axis of the rotary shaft 41 supported by the main bearing 21). Hereinafter, a direction in which each of the dashed lines Lc extends is also referred to as an axial direction A. The supercharger 1 of the present embodiment is mounted on the aforementioned vehicle so that the axial direction A extends generally horizontally. In addition, a direction orthogonal to the axial direction A and extending generally vertically is also referred to as a vertical direction B. The vertical direction B is also one of radial directions of the rotary shaft 41.

The main body case 10 has an exhaust gas flow passage 11, an intake air flow passage 12, a bearing space 13, a pair of shaft accommodating portions 14, a supply passage 15, and a discharge passage 16. The turbine wheel 42 is accommodated in the exhaust gas flow passage 11. The compressor impeller 43 is accommodated in the intake air flow passage 12.

The turbine wheel 42 is rotated by pressure of the exhaust gas that is discharged from the internal combustion engine and flows into the exhaust gas flow passage 11. That is, the turbine wheel 42 is rotated by the pressure of the exhaust gas of the internal combustion engine. After rotating the turbine wheel 42, the exhaust gas flows out from the exhaust gas flow passage 11. The compressor impeller 43, which rotates with the turbine wheel 42, compresses intake air flowing into the intake air flow passage 12 and causes the compressed intake air to flow out to the internal combustion engine. That is, high-pressure intake air is discharged from the intake air flow passage 12.

In FIGS. 1 and 2, the turbine wheel 42 and the compressor impeller 43 are indicated by the two-dot chain lines (outer shell lines). More specifically, the set of positions (points) that are farthest from the dashed lines Lc of the turbine wheel 42 and the compressor impeller 43 are indicated by the two-dot chain lines.

A length t1 represents a minimum length (gap, clearance) from the inner surface of the main body case 10 forming the exhaust gas flow passage 11 to the turbine wheel 42 (see FIG. 1). Similarly, a length t2 represents a minimum length from the inner surface of the main body case 10 forming the intake air flow passage 12 to the compressor impeller 43. Since the gaps are formed between the turbine wheel 42 and the inner surface of the main body case 10, and between the compressor impeller 43 and the inner surface of the main body case 10, contact (interference) between the turbine wheel 42 and the inner surface of the main body case 10, and between the compressor impeller 43 and the inner surface of the main body case 10 is avoided when the rotating body rotates.

The main bearing 21 is accommodated in the bearing space 13. The main bearing 21 has a substantially cylindrical shape, and the rotary shaft 41 is inserted through the main bearing 21. The main bearing 21 is a sliding bearing of a semi-floating type, and is disposed between an inner wall surface of the main body case 10 forming the bearing space 13 and an outer peripheral surface of the rotary shaft 41. The main bearing 21 rotatably holds (supports) the rotary shaft 41.

Oil Passage

In FIG. 2, an example of distribution of lubricating oil in the supercharger 1 is illustrated with a pattern. Lubricating oil is supplied from an oil pump (not illustrated) to the supply passage 15. Lubricating oil supplied to the supply passage 15 flows into the bearing space 13, and forms an oil film between the inner wall surface of the bearing space 13 and the outer peripheral surface of the main bearing 21. In addition, the oil film is also formed between an inner peripheral surface of the main bearing 21 and the outer peripheral surface of the rotary shaft 41. That is, the main bearing 21 is in contact with a portion of the rotary shaft 41 where lubricating oil is retained. More specifically, a plurality of bearing oil holes 21a is formed in a generally central portion of the main bearing 21 in the axial direction A. The bearing oil holes 21a each extend in the radial direction (i.e., the direction orthogonal to the axial direction A). Part of lubricating oil having flowed into the bearing space 13 enters a gap between the inner peripheral surface of the main bearing 21 and the outer peripheral surface of the rotary shaft 41 through the bearing oil holes 21a (specifically, the bearing oil holes 21a located above the rotary shaft 41) and the outside of opposite ends of the main bearing 21 (that is, the left and right ends of the main bearing 21 in FIG. 2).

Lubricating oil having flowed into the bearing space 13 is discharged from the supercharger 1 through the discharge passage 16. Lubricating oil forming the oil film between the inner peripheral surface of the main bearing 21 and the outer peripheral surface of the rotary shaft 41 is discharged through the bearing oil holes 21a (specifically, the bearing oil holes 21a located below the rotary shaft 41) to the discharge passage 16. Lubricating oil supplied to the supercharger 1 does not necessarily have to be specifically purposed for lubrication (i.e., friction reduction), and may be a type of oil that has functions such as sealing and cooling.

Shaft Seal for Lubricating Oil

The shaft accommodating portions 14 each have a labyrinth structure including shaft seals 44 to prevent lubricating oil in an oil passage 51 from reaching the turbine wheel 42 and/or the compressor impeller 43. More specifically, the shaft seals 44 are fixed to the inner surface of the main body case 10 forming the shaft accommodating portions 14. The shaft seals 44 each have a ring shape, and the rotary shaft 41 is inserted through the shaft seals 44.

An inner peripheral surface of each of the shaft seals 44 protrudes toward the rotary shaft 41. On the other hand, the rotary shaft 41 has annular recesses 41a corresponding to the shaft seals 44 (see FIG. 2). A combination of the annular recesses 41a of the rotary shaft 41 and the shaft seals 44 (i.e., the labyrinth structure) suppresses movement of fluid in the axial direction A.

In the labyrinth structure, a length (i.e., a gap) from the inner surface of the main body case 10 forming the shaft accommodating portions 14 to the outer surface of the rotary shaft 41 is relatively small. A length t3 represents a minimum value of a gap between the rotary shaft 41 and one of the shaft accommodating portions 14 on the turbine wheel 42 side (see FIG. 2). Similarly, a length t4 represents a minimum value of the gap between the rotary shaft 41 and the other the shaft accommodating portions 14 on the compressor impeller 43 side. In the present embodiment, the length t3 and the length t4 are substantially equal to each other. In addition, the length t3 and the length t4 are smaller than the length t1 and the length t2, respectively.

Furthermore, annular protrusions 41b are formed in sections of the rotary shaft 41 between the main bearing 21 and the shaft seals 44, respectively, in order to separate lubricating oil on the rotary shaft 41 before lubricating oil reaches the shaft seals 44 (see FIG. 2). Inner diameters of sections of the shaft accommodating portions 14 facing the annular protrusions 41b are increased. That is, recesses corresponding to the annular protrusions 41b are formed in the inner surface of the main body case 10. The shaft accommodating portions 14 are connected to the discharge passage 16. In other words, the shaft accommodating portions 14 connected to the discharge passage 16 form a lubricating oil discharge passage (i.e., an oil drain).

While the supercharger 1 operates (i.e., while the rotary shaft 41 rotates), most of lubricating oil flowing from the oil passage 51 to the shaft seals 44 on the surface of the rotary shaft 41 separates from the rotary shaft 41 at tops of the annular protrusions 41b by the centrifugal force, and flows into the shaft accommodating portions 14. That is, lubricating oil on the rotary shaft 41 is separated at the positions of the rotary shaft 41 where the radius of the rotary shaft 41 is at the maximum, which are the sections of the rotary shaft 41 where the annular protrusions 41b are formed, and flows into the shaft accommodating portions 14. Lubricating oil flowing into the shaft accommodating portions 14 is discharged through the discharge passage 16.

Auxiliary Bearing

The auxiliary bearings 45 are fixed to the inner surface of the main body case 10 forming the shaft accommodating portions 14, respectively, at positions between the main bearing 21 and the annular protrusions 41b. Thus, the auxiliary bearings 45 are disposed between the main bearing 21 and the shaft seals 44, respectively, in the axial direction A. The auxiliary bearings 45 each have a ring shape, and the rotary shaft 41 is inserted into the auxiliary bearings 45. A length t5 represents a dimension of the gap between the outer peripheral surface of the rotary shaft 41 supported by the main bearing 21 and the inner peripheral surface of the auxiliary bearings 45 (see FIG. 2). That is, a radius of a through hole formed by the inner peripheral surface of each of the auxiliary bearings 45 and having a cylindrical shape is greater than a radius of each of sections of the rotary shaft 41 facing the auxiliary bearings 45 by the length t5. The length t5 is smaller than each of the lengths t1 to t4.

More specifically, a runout deviation of the main bearing 21 is smaller than the length t5. In other words, the runout of the rotary shaft 41, which is rotatably supported by the main bearing 21, is smaller than the length t5, and therefore, there is no contact (interference) between the rotary shaft 41 and the auxiliary bearings 45. That is, gaps (spaces) are formed between the outer peripheral surface of the rotary shaft 41 and the inner peripheral surfaces of the auxiliary bearings 45.

However, as the runout deviation of the main bearing 21 increases due to damage and the like, the gaps between the rotary shaft 41 and the auxiliary bearings 45 decrease. When the runout deviation of the main bearing 21 becomes relatively large (that is, when the performance of the main bearing 21 deteriorates), the rotary shaft 41 is placed in contact with one of or both of the auxiliary bearings 45. In other words, when the main bearing 21 is unable to rotatably support the rotary shaft 41, the auxiliary bearings 45 rotatably support the rotary shaft 41.

When the rotary shaft 41 is rotatably supported by the auxiliary bearings 45, the runout of the rotary shaft 41 (i.e., the runout deviation of the rotary shaft 41 supported by the auxiliary bearings 45) is smaller than each of the lengths t1 to t4. In other words, when the rotary shaft 41 is rotatably supported by the auxiliary bearings 45, the runout of the rotary shaft 41 becomes larger as compared with a case where the rotary shaft 41 is supported by the main bearing 21. However, the length t5 is adapted to prevent the rotating body and the surrounding parts (specifically, the main body case 10 and the shaft seals 44) from coming into contact with each other even when the rotary shaft 41 is rotatably supported by the auxiliary bearings 45.

As illustrated in FIG. 3, the auxiliary bearings 45 have oil grooves 45a, respectively. More specifically, the oil grooves 45a are recesses that extend in the axial direction A in the inner peripheral surfaces of the auxiliary bearings 45 (that is, the surfaces of the auxiliary bearings 45 facing the outer peripheral surface of the rotary shaft 41). The oil grooves 45a are provided at 120° intervals with respect to the center of each of the auxiliary bearings 45 having a ring shape. That is, three oil grooves 45a are formed in each of the auxiliary bearings 45. In FIG. 3, two of the three oil grooves 45a are illustrated.

The auxiliary bearings 45 of the present embodiment are made of phosphor bronze, which is a type of a wear-resistant material. Therefore, the auxiliary bearings 45 have excellent wear resistance. As a result, even when the rotary shaft 41 supported by the auxiliary bearings 45 rotates, wear of the auxiliary bearings 45 (i.e., deformation of the auxiliary bearings 45 and, hence, an increase in runout of the rotary shaft 41 supported by the auxiliary bearings 45) may be suppressed. Copper alloys (e.g., copper lead alloys) or aluminum alloys (e.g., aluminum-tin alloys) may be used as a wear-resistant material for the auxiliary bearings 45. For example, the auxiliary bearings 45 each have an inner diameter (i.e., the diameter of the through hole through which the rotary shaft 41 is inserted) of 10 mm, and a thickness (i.e., dimension in the axial direction A) of 3 to 5 mm. In addition, the rotary shaft 41 is also made of a wear-resistant material.

As described above, in the supercharger 1, when the main bearing 21 is unable to rotatably support the rotary shaft 41, the auxiliary bearings 45 rotatably support the rotary shaft 41. That is, even if performance of the main bearing 21 deteriorates, the rotating body (i.e., the rotary shaft 41, the turbine wheel 42, and the compressor impeller 43) is rotatably supported without interfering with the surrounding parts, so that the supercharger 1 can continue the operation.

As described above, the length t3 and the length t4 are smaller than length t1 and the length t2, respectively. If the auxiliary bearings 45 are not provided in the supercharger 1, the rotating body is placed in contact with the shaft seals 44 and the portion of the inner surface of the main body case 10 near the shaft seals 44 (not with the inner surfaces of the exhaust gas flow passage 11 and the intake air flow passage 12) in a case where the main bearing 21 is unable to rotatably support the rotary shaft 41. In this case, the rotation of the rotating body is hindered, so that it is difficult to continue the operation of the supercharger 1.

In addition, when the auxiliary bearings 45 support the rotary shaft 41, the auxiliary bearings 45 are placed in contact with the portions of the rotary shaft 41 where the oil films are formed (i.e., the area where lubricating oil is retained, also referred to as an "oil area"). Thus, wear of the auxiliary bearings 45 and/or the rotary shaft 41 may be suppressed. In other words, a state in which the auxiliary bearings 45 rotatably supports the rotary shaft 41 may be maintained for a relatively long period. In addition, the formation of the oil films on the portions of the rotary shaft 41 facing the auxiliary bearings 45 allows the frictional resistance between the rotary shaft 41 and the auxiliary bearings 45 to be reduced.

More specifically, since lubricating oil is supplied to the bearing space 13 through the supply passage 15, the oil film is formed between the main bearing 21 and the rotary shaft 41. Even if lubricating oil supplied to the rotary shaft 41 flows toward the turbine wheel 42 and/or the compressor impeller 43, most of lubricating oil is separated from the rotary shaft 41 by the annular protrusions 41b. Furthermore, the shaft seals 44 prevent lubricating oil from reaching the turbine wheel 42 and/or the compressor impeller 43. That is, the oil areas are defined by the shaft seals 44. Thus, the oil films sufficient to reduce wear of the auxiliary bearings 45 are most likely to be formed in the portions of the rotary shaft 41 between the main bearing 21 and the annular protrusions 41b. In other words, lubricating oil that has flowed into the supercharger 1 through the supply passage 15 is sufficiently supplied to the main bearing 21 and the auxiliary bearings 45.

In addition, the rotary shaft 41 made of a wear-resistant material may contribute to further reduction in wear of the auxiliary bearings 45. On the other hand, since the rotary shaft 41 is not in contact with the shaft seals 44 even when the auxiliary bearings 45 rotatably supports the rotary shaft 41, the shaft seals 44 do not have to be made of a wear-resistant material.

Furthermore, the formation of the oil grooves 45a in the auxiliary bearings 45 allows the oil films formed on the portions of the rotary shaft 41 facing the auxiliary bearings 45 to be distributed evenly. Thus, the oil grooves 45a contribute to reduction in wear in the auxiliary bearings 45 and reduction in friction between the rotary shaft 41 and the auxiliary bearings 45.

Although the embodiment of the present disclosure has been described with reference to the above structure, many substitutions, improvements, and modifications can be made without departing from the object of the present disclosure. Thus, the embodiment of the present disclosure may include all substitutions, improvements, and modifications that do not deviate from the spirit and purpose of appended claims. The embodiment of the present disclosure is not limited to the above specific structure, and may be modified as exemplified below.

The main bearing 21 is a sliding bearing in the above embodiment. Instead, the main bearing 21 may be provided by a rolling bearing (i.e., a ball bearing including a rolling body) that rotatably supports the rotary shaft 41. Even in this case, the main bearing 21 rotatably supports the rotary shaft 41, and the auxiliary bearings 45 rotatably support the rotary shaft 41 when the main bearing 21 is unable to rotatably support the rotary shaft 41. In addition, the rolling bearing (especially, the rolling body in the rolling bearing) is placed in contact with the rotary shaft 41 through the oil film (that is, lubricating oil supplied through the oil passage 51 and retained on the rotary shaft 41).

In the above-described embodiment, the auxiliary bearings 45 are made of a wear-resistant material. Instead, the auxiliary bearings 45 may be made of known iron-based materials, and a coating of a wear-resistant material may be applied to the inner peripheral surfaces of the auxiliary bearings 45 (that is, the portions in contact with the rotary shaft 41). In other words, the entire auxiliary bearings 45 do not have to be made of a wear-resistant material. Alternatively, the portions of the rotary shaft 41 facing the auxiliary bearings 45 may be coated with a wear-resistant material. At least the sections of the rotary shaft 41 facing the auxiliary bearings 45 may be made of a wear-resistant material.

In the above-described embodiment, the turbine wheel 42 and the compressor impeller 43 are fixed to the rotary shaft 41. Instead, the turbine wheel 42, the compressor impeller 43, and the rotary shaft 41 (i.e., the rotating body) may be integrally formed.

What is claimed is:

1. A supercharger comprising:
   a rotary shaft having a turbine wheel and a compressor impeller;
   a main bearing in contact with an oil area of the rotary shaft where lubricating oil is retained to rotatably support the rotary shaft; and
   a plurality of auxiliary bearings in contact with the oil area to rotatably support the rotary shaft when the main bearing is unable to support the rotary shaft,
   wherein a first auxiliary bearing of the plurality of auxiliary bearings is provided between the main bearing and the turbine wheel in an axial direction of the rotary shaft, and
   a second auxiliary bearing of the plurality of auxiliary bearings is provided between the main bearing and the compressor impeller in the axial direction of the rotary shaft.

2. The supercharger according to claim 1, further comprising
   first and second shaft seals defining the oil area, wherein
   the first auxiliary bearing is disposed between the main bearing and the first shaft seal in the axial direction of the rotary shaft, and
   the second auxiliary bearing is disposed between the main bearing and the second shaft seal in the axial direction of the rotary shaft.

3. The supercharger according to claim 1, wherein
   the rotary shaft includes first and second annular protrusions for separating the lubricating oil from the rotary shaft, and
   the first auxiliary bearing is disposed between the main bearing and the first annular protrusion, and
   the second auxiliary bearing is disposed between the main bearing and the second annular protrusion.

4. The supercharger according to claim 1, wherein
   at least one of a portion of the rotary shaft in contact with the plurality of auxiliary bearings and a portion of the plurality of auxiliary bearing in contact with the rotary shaft is made of a wear-resistant material.

5. The supercharger according to claim 1, wherein
   each auxiliary bearing of the plurality of auxiliary bearings includes an oil groove, which is a recess provided to extend in the axial direction in an inner peripheral surface of the auxiliary bearing.

6. The supercharger according to claim 1, further comprising
   a main body case including an exhaust gas flow passage and an intake air flow passage, wherein
   the turbine wheel is accommodated in the exhaust gas flow passage,
   the compressor impeller is accommodated in the intake air flow page,
   a gap is provided between an outer peripheral surface of the rotary shaft and an inner peripheral surface of each of the plurality of auxiliary bearings,
   a length of the gap is smaller than a minimum length from an inner surface of the main body case forming the exhaust gas flow passage to the turbine wheel, and
   the length of the gap is smaller than a minimum length from an inner surface of the main body case forming the intake gas flow passage to the compressor impeller.

* * * * *